US012155413B2

(12) United States Patent
Tochino et al.

(10) Patent No.: US 12,155,413 B2
(45) Date of Patent: Nov. 26, 2024

(54) COMMUNICATION DEVICE, COMMUNICATION METHOD, COMMUNICATION SYSTEM AND COMMUNICATION PROGRAM

(71) Applicant: NIPPON TELEGRAPH AND TELEPHONE CORPORATION, Tokyo (JP)

(72) Inventors: Takamitsu Tochino, Musashino (JP); Hirotaka Ujikawa, Musashino (JP); Hirotaka Nakamura, Musashino (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 142 days.

(21) Appl. No.: 18/015,403

(22) PCT Filed: Jul. 15, 2020

(86) PCT No.: PCT/JP2020/027562
§ 371 (c)(1),
(2) Date: Jan. 10, 2023

(87) PCT Pub. No.: WO2022/013986
PCT Pub. Date: Jan. 20, 2022

(65) Prior Publication Data
US 2023/0261744 A1    Aug. 17, 2023

(51) Int. Cl.
*H04B 10/079* (2013.01)
*H04B 10/077* (2013.01)
(52) U.S. Cl.
CPC ..... *H04B 10/0791* (2013.01); *H04B 10/0771* (2013.01); *H04B 10/0795* (2013.01)
(58) Field of Classification Search
CPC .......................................... H04B 10/079–0799
See application file for complete search history.

(56) References Cited

U.S. PATENT DOCUMENTS

2002/0176131 A1\* 11/2002 Walters ............... H04J 14/0295
398/58
2023/0188240 A1\* 6/2023 Tochino .................. H04J 3/085
398/102

FOREIGN PATENT DOCUMENTS

JP          2008193611 A    \*   8/2008

OTHER PUBLICATIONS

Sakamaki et al., "Optical Switch Technology for Obtaining More Flexible Optical Nodes", NTT Technology Journal, Nov. 2013 (https://www.ntt.co.jp/journal/1311/files/jn201311016.pdf(Year: 2013).\*

(Continued)

*Primary Examiner* — Li Liu
(74) *Attorney, Agent, or Firm* — Harness, Dickey & Pierce, P.L.C.

(57) ABSTRACT

A communication device is connected to a wavelength-multiplexed optical ring network, and performs communication by performing time-division multiplexing on optical signals at each wavelength. In a case where a control signal transmitted from the master communication device is not received in a predetermined period, the communication device instructs a scheduler unit to suspend transmission of data at a failure wavelength that is the wavelength at which the host communication device has been determined not to be operating properly, also instructs the scheduler unit to transmit the data stored in the buffer of the failure wavelength at another wavelength, and suspends allocation of new data to the buffer of the failure wavelength. Thus, the delay in transmission of data at the failure wavelength can be shortened.

7 Claims, 5 Drawing Sheets

(56) References Cited

OTHER PUBLICATIONS

Yohei Sakamaki et al., "Optical switch technology that realizes a more flexible optical node", NTT Technical Journal, vol. 25, No. 11, 2013, pp. 16-20, https://www.ntt.co.jp/journal/1311/files/jn201311016.pdf.

* cited by examiner

COMMUNICATION DEVICE, COMMUNICATION METHOD, COMMUNICATION SYSTEM AND COMMUNICATION PROGRAM

CROSS-REFERENCE TO RELATED APPLICATIONS

This application is a 371 U.S. National Phase of International Application No. PCT/JP2020/027562, filed on Jul. 15, 2020. The entire disclosure of the above application is incorporated herein by reference.

TECHNICAL FIELD

The present invention relates to a technology for conducting communication by performing time-division multiplexing on optical signals for each wavelength in a wavelength-multiplexed optical ring network that forms a communication system.

BACKGROUND ART

A conventional optical ring network system conducts communication by multiplexing optical signals having wavelengths allocated beforehand to a plurality of optical transmission devices connected to an optical ring network by an optical add-drop multiplexer (OADM) technology (see Non Patent Literature 1, for example).

On the other hand, there is a known burst optical ring network technology for transmitting optical signals by time-division multiplexing, instead of OADM. By this technology, one optical transmission among a plurality of optical transmission devices connected to an optical ring network operates as a master device, and the other optical transmission devices operate as slave devices. The master device transmits an allocation signal and a search signal, to control the data transmission timings of the slave devices including the subject device, and register a slave device newly connected to the optical ring network. In this manner, the plurality of optical transmission devices connected to the optical ring network can conduct communication by perform time-division multiplexing on optical signals by the burst optical ring network technology.

Here, by the burst optical ring network technology, in a case where the master device cannot operate properly due to a failure or the like, a slave device may sense a failure in the master device, and start operating as the new master device. Such a method may be adopted to continue the system operation.

CITATION LIST

Non Patent Literature

Non Patent Literature 1: Sakamaki et al., "Optical Switch Technology for Obtaining More Flexible Optical Nodes", NTT Technology Journal, November 2013 (https://www.ntt.co.jp/journal/1311/files/jn201311016.pdf)

SUMMARY OF INVENTION

Technical Problem

However, after a failure in the master device is sensed, during the period until a slave device starts operating as the new master device, untransmitted data is accumulated in the buffer of the slave device, and therefore, a transmission delay occurs.

The present invention aims to provide a communication device, a communication method, a communication system, and a communication program that are designed to shorten the transmission delay during the period until a slave device starts operating as a new master device in a case where the master device fails to operate properly, the master device being connected to a wavelength-multiplexed optical ring network and controlling a plurality of optical transmission devices that conduct communication by performing time-division multiplexing on optical signals for each wavelength.

Solution to Problem

A communication device according to the present invention includes: a communication unit that is connected to a wavelength-multiplexed optical ring network, conducts communication by performing time-division multiplexing on optical signals for each wavelength, and receives a control signal transmitted from a master communication device; a determination unit that determines, for each wavelength, that the master communication device is not operating properly, when the control signal is not received in a predetermined period; an allocation unit that allocates data to be transmitted to a buffer of each wavelength; a scheduler unit that transmits, for each wavelength, data stored in the buffer of each wavelength in accordance with a predetermined schedule; a scheduler control unit that instructs the scheduler unit to suspend transmission of data at a failure wavelength, and instructs the scheduler unit to transmit the data stored in the buffer of the failure wavelength at another wavelength, the failure wavelength being a wavelength at which the master communication device has been determined not to be operating properly; and an allocation control unit that suspends allocation of new data to the buffer of the failure wavelength.

The present invention also relates to a communication method that is used in a communication system that conducts communication by performing time-division multiplexing on optical signals for each wavelength, one communication device of a plurality of communication devices connected to a wavelength-multiplexed optical ring network being a master communication device, the other communication devices being slave communication devices. The master communication device transmits a control signal to a plurality of the slave communication devices. Each slave communication device determines, for each wavelength, that the master communication device is not operating properly when the control signal is not received from the master communication device in a predetermined period, and instructs a scheduler unit to suspend transmission of data at a failure wavelength, the scheduler unit controlling transmission of data at the failure wavelength, the failure wavelength being the wavelength at which the master communication device has been determined not to be operating properly. When there is data stored in the buffer of the failure wavelength, the slave communication device instructs the scheduler unit to transmit the data stored in the buffer of the failure wavelength at another wavelength, and suspends allocation of new data to the buffer of the failure wavelength.

The present invention also relates to a communication system that conducts communication by performing time-division multiplexing on optical signals for each wavelength, one communication device of a plurality of communication devices connected to a wavelength-multiplexed optical ring network being a master communication device, the other communication devices being slave communication devices. The master communication device transmits a control signal to a plurality of the slave communication devices. Each slave communication device determining, for each wavelength, that the master communication device is not operating properly when the control signal is not received from the master communication device in a predetermined period, and instructs a scheduler unit to suspend transmission of data at a failure wavelength, the scheduler unit controlling transmission of data at the failure wavelength, the failure wavelength being the wavelength at which the master communication device has been determined not to be operating properly. When there is data stored in the buffer of the failure wavelength, the slave communication device instructs the scheduler unit to transmit the data stored in the buffer of the failure wavelength at another wavelength, and suspends allocation of new data to the buffer of the failure wavelength.

Further, a communication program according to the present invention causes a computer or an integrated circuit to perform the processes that are performed by the determination unit, the scheduler control unit, and the allocation control unit of the communication device described above.

Advantageous Effects of Invention

A communication device, a communication method, a communication system, and a communication program according to the present invention can shorten the transmission delay during the period until a slave device starts operating as the new master device in a case where the master device fails to operate properly, the master device being connected to a wavelength-multiplexed optical ring network and controlling a plurality of optical transmission devices that conduct communication by performing time-division multiplexing on optical signals for each wavelength.

BRIEF DESCRIPTION OF DRAWINGS

FIG. 3 is a flowchart showing an example process to be performed when the master device cannot operate properly due to a failure or the like.

DESCRIPTION OF EMBODIMENTS

The following is a description of an embodiment of a communication device, a communication method, a communication system, and a communication program according to the present invention, with reference to the drawings. Note that the embodiment concerns an optical ring network system (corresponding to the communication system) that includes a plurality of optical transmission devices (corresponding to the communication devices) connected via an optical ring network.

Figure 1:
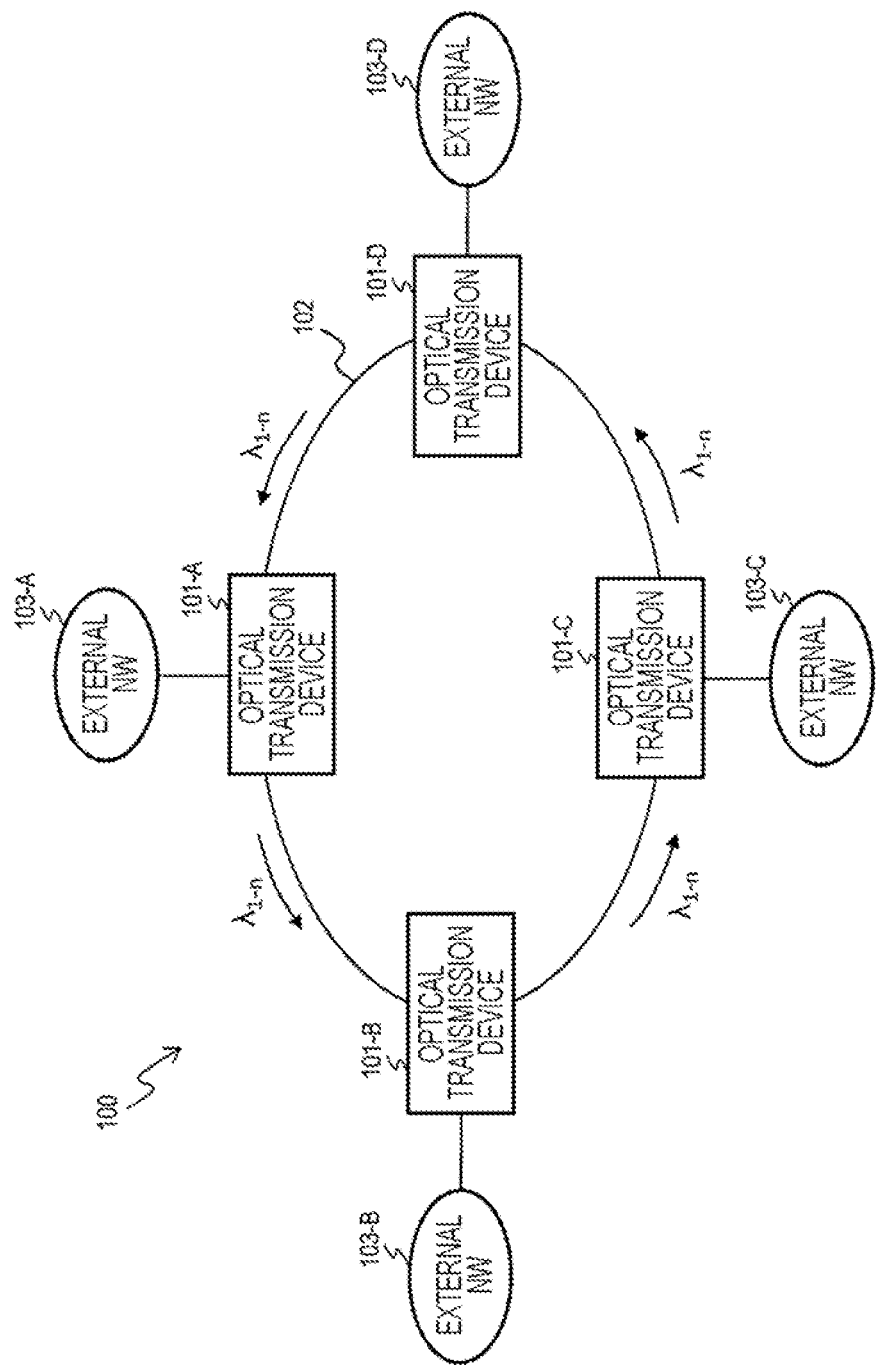
FIG. 1 is a diagram illustrating an example of an optical ring network system according to an embodiment.

FIG. 1 illustrates an example of an optical ring network system 100 according to the embodiment.

In the example illustrated in FIG. 1, an optical transmission device 101-A, an optical transmission device 101-B, an optical transmission device 101-C, and an optical transmission device 101-D are connected by a ring-like network (an optical ring network 102) formed with optical fibers.

In a case where an explanation common to the optical transmission device 101-A, the optical transmission device 101-B, the optical transmission device 101-C, and the optical transmission device 101-D is made herein, the alphabet at the end of each reference numeral is omitted, and each optical transmission device is referred to as the optical transmission device 101. In a case where a specific device among the plurality of optical transmission devices 101 is described, the specific device is referred to as the optical transmission device 101-A, for example, with an alphabet added at the end of reference numeral. The same applies to an external network (NW) 103-A, an external NW 103-B, an external NW 103-C, and an external NW 103-D.

The external NWs 103 are connected to the respective optical transmission devices 101, and communication between these external NWs 103 can be performed via the optical ring network 102. Here, data received from an external NW 103 is allocated to optical signals of a plurality of wavelengths to be subjected to wavelength multiplexing, and is transmitted to the optical transmission device 101 as the communication destination.

The external NWs 103 are NWs connected to the optical ring network system mentioned above, and have NW devices or the like connected thereto.

Here, the optical ring network system 100 according to the embodiment performs wavelength multiplexing on optical signals, to conduct communication. For example, in FIG. 1, optical signals of n (n being a positive integer) wavelengths of $\lambda_{1-n}$ are subjected to wavelength multiplexing.

Further, the optical ring network system 100 uses a burst optical ring network technology. By this technology, the plurality of optical transmission devices 101 performs time-division multiplexing (optical time division multiple access (TDMA)) on optical signals of the respective wavelengths, to conduct communication in the optical ring network 102.

In FIG. 1, of the plurality of optical transmission devices 101, one optical transmission device 101 operates as the master device (corresponding to the master communication device), and the other optical transmission devices 101 operate as slave devices (corresponding to the slave communication devices). The master device controls the optical signal transmission timings for all the devices for each wavelength. Here, the master device in the initial state is determined in advance. For example, in a case where the optical transmission device 101-A is the master device, the optical transmission device 101-B, the optical transmission device 101-C, and the optical transmission device 101-D are the slave devices.

The optical transmission device 101 as the master device determines the optical signal transmission timings for all the optical transmission devices 101 including the subject device, and transmits a control signal (an allocation signal) for allocating the optical signal transmission timings to the optical transmission devices 101 as the slave devices. The optical transmission device 101 as the master device also transmits a control signal (a search signal) for detecting an optical transmission device 101 as a slave device newly connected to the optical ring network 102. Note that it is necessary to allocate transmission timings every time an optical signal is transmitted, and an allocation signal is regularly transmitted. Further, the search signal may be regularly transmitted, or may be irregularly transmitted.

Here, an allocation signal includes information for allocating an optical signal transmission timing. For example, an allocation signal includes information such as a device identifier for identifying the allocation-target optical transmission device 101, a transmission start time indicating the time to start transmitting the optical signal, and a transmission time (transmission duration) indicating the time during which the optical signal is to be transmitted. A search signal includes information such as a transmission start time indicating the time at which the newly connected optical transmission device 101 is to start transmitting a registration request signal for requesting registration to the master device, and a transmission time indicating the time during which the registration request signal is to be transmitted.

An optical transmission device 101 as a slave device transmits an optical signal at the transmission timing allocated by an allocation signal received from the master device. Further, in a case where an optical transmission device 101 as a slave device is newly connected to the optical ring network 102, the optical transmission device 101 transmits a registration request signal to the master device, on the basis of a search signal received from the master device. In this manner, the optical transmission device 101 as a slave device newly connected to the optical ring network 102 can be registered with the master device. After that, the registered optical transmission device 101 as a slave device can transmit an optical signal at the transmission timing allocated by an allocation signal received from the master device.

As described above, the optical transmission device 101 functioning as the master device controls the timings at which all the optical transmission devices 101 including the subject device transmit optical signals for each wavelength, and performs registration at the time of a new connection and the like. Here, the same optical transmission device 101 functions as the master device for all the wavelengths in this embodiment. However, a different optical transmission device 101 may function as the master device for each wavelength. Alternatively, several wavelength groups may be formed so that a different optical transmission device 101 may function as the master device for each group.

Here, in a case where the master device cannot operate properly due to a failure or the like in the optical ring network system 100 illustrated in FIG. 1, any allocation signal and any search signal are not transmitted, and therefore, the system operation cannot be continued. To counter this, each optical transmission device 101 according to the embodiment is an optical transmission device 101 as a slave device that has a function of operating as the master device and being able to continue the system operation in a case where the optical transmission device 101 as the master device cannot operate properly.

Note that, since the above process is performed for each wavelength, in a case where the master device cannot operate properly at a specific wavelength (referred to as the failure wavelength), data at the failure wavelength is not transmitted during the period until a slave device starts operating in place of the master device, and a transmission delay of the data stored in the buffer occurs. Therefore, the optical ring network system 100 according to the embodiment has a function of transmitting data at the failure wavelength at another wavelength during the period until the slave device starts operating in place of the master device. Note that, at the wavelengths other than the failure wavelength, the master device operates properly. Alternatively, instead of a single master device for a plurality of wavelengths, different master devices may be set for the respective wavelengths. With this arrangement, even in a case where the master device of a certain wavelength fails, transmission can be performed by a master device of another wavelength.

(Example Configuration of an Optical Transmission Device 101)

The four optical transmission devices 101 described with reference to FIG. 1 each have the functions of both a master device and a slave device, and choose to operate as a master device or a slave device. For example, in a case where the functions of a master device are selected, the optical transmission device 101-A operates as the master device, and, in a case where the functions of a slave device are selected, the optical transmission device 101-A operates as a slave device.

Here, in the description below, the optical transmission device 101-A operates as the master device, and the optical transmission device 101-B, the optical transmission device 101-C, and the optical transmission device 101-D operate as the slave devices. Further, in the case described below, communication at a specific wavelength cannot be performed properly, due to a failure in the optical transmission device 101-A operating as the master device.

Figure 2:
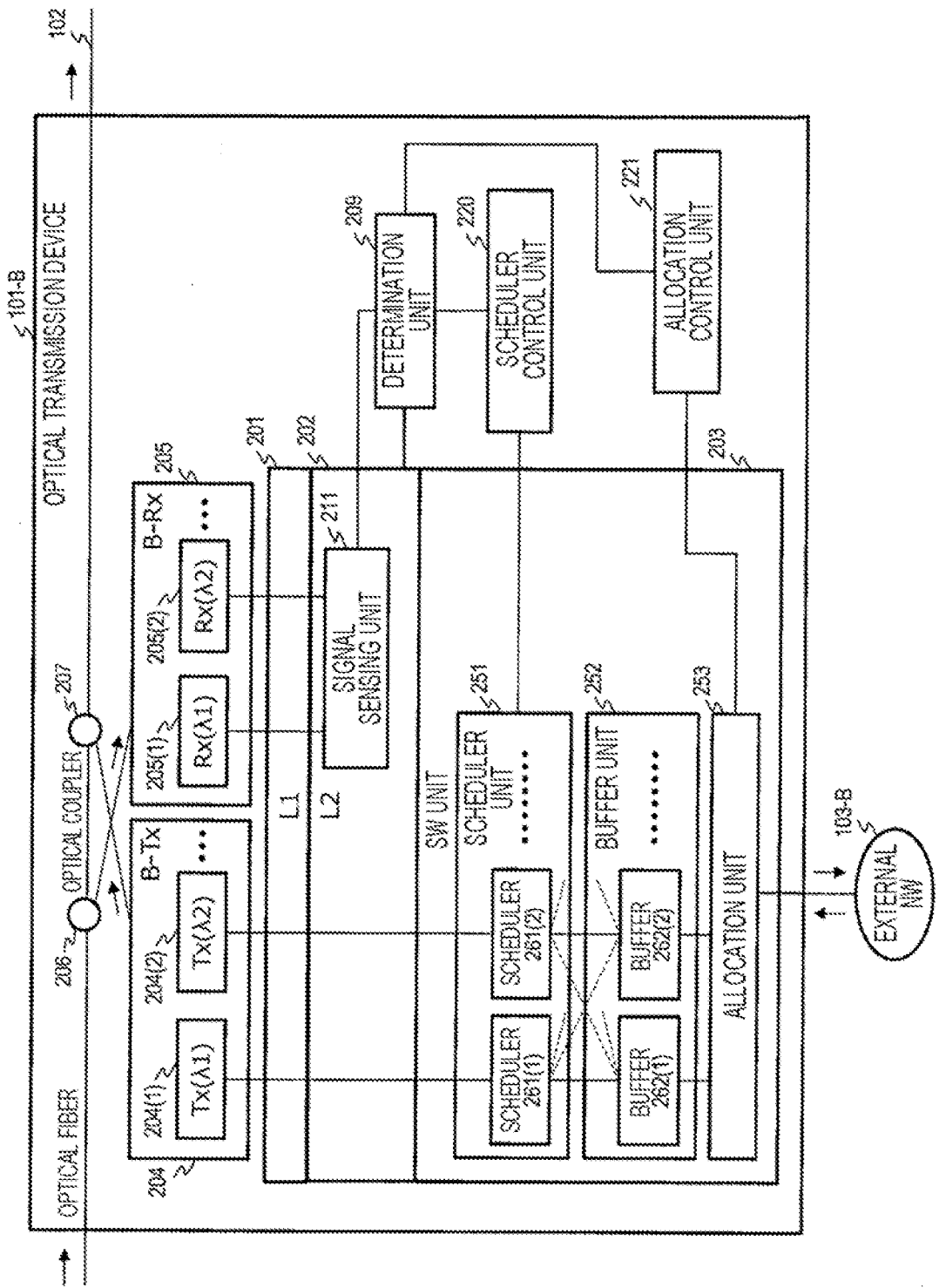
FIG. 2 is a diagram illustrating an example configuration of an optical transmission device operating as a slave device.

FIG. 2 illustrates an example configuration of the optical transmission device 101-B operating as a slave device as illustrated in FIG. 1. Note that the optical transmission device 101-C and the optical transmission device 101-D operating as the same slave devices as the optical transmission device 101-B operate in the same manner as the optical transmission device 101-B.

In FIG. 2, the optical transmission device 101-B includes a layer-1 processing unit (L1 unit) 201, a layer-2 processing unit (L2 unit) 202, a switch unit (SW unit) 203, an optical transmission unit (B-Tx unit) 204, an optical reception unit (B-Rx unit) 205, an optical coupler 206, an optical coupler 207, a determination unit 209, a scheduler control unit 220, and an allocation control unit 221.

The L1 unit 201 has a function of processing an OSI-reference-model first layer (a physical layer).

The L2 unit 202 has a function of processing an OSI-reference-model second layer (a data link layer). In the embodiment, the L2 unit 202 includes a signal sensing unit 211 described later. The signal sensing unit 211 senses an allocation signal or a search signal from an optical signal received from the optical ring network 102. The L2 unit 202 also has the functions of both a master device and a slave device, and operates with the functions of either device, on the basis of a command from the determination unit 209 described later. In the case of a master device, the L2 unit 202 performs transmission timing control, and senses and registers an unregistered optical transmission device 101. In the case of a slave device, the L2 unit 202 controls the transmission timing of the optical signal to be transmitted from the B-Tx unit 204 in accordance with the transmission start time and the transmission time designated by the master device, and receives a search signal from the master device to perform registration. Note that the above processes are performed for each wavelength.

The SW unit 203 is an electric packet switch such as a L2-SW connected to the external NW 103-B, and has a function of processing a packet transfer between the L2 unit 202 and the external NW 103-B in accordance with preset rules. In the embodiment, the SW unit 203 includes a scheduler unit 251, a buffer unit 252, and an allocation unit 253.

The scheduler unit 251 has a scheduler 261 for each wavelength. Each scheduler 261 transmits the data stored in a buffer 262 for each wavelength from the B-Tx unit 204 at the scheduled transmission timing designated in advance. For example, transmission at a wavelength λ1 is handled by the scheduler 261(1), and transmission at a wavelength 22 is handled by the scheduler 261(2). Note that, in the embodiment, each scheduler 261 has a function of reading the data stored in the buffers 262 for wavelengths other than the corresponding wavelength and transmitting the data at the corresponding wavelength. For example, the data stored in the buffer 262(2) of a failure wavelength 22 in the buffer unit 252 can be read and transmitted by the scheduler 261(1) of another wavelength λ1 that has no failures therein, in accordance with a command from the scheduler control unit 220.

The buffer unit 252 accumulates data received from the allocation unit 253, and transmits the data in accordance with a command from the scheduler unit 251. Note that the buffer unit 252 includes a buffer 262 for each wavelength to be used. For example, the wavelength λ1 corresponds to the buffer 262(1), and the wavelength λ2 corresponds to the buffer 262(2). Note that, in the embodiment, the data at each wavelength stored in a buffer 262 can be transmitted from the scheduler 261 of any wavelength in the scheduler unit 251. For example, as indicated by dotted lines in FIG. 2, the data stored in the buffer 262(1) of the wavelength λ1 can be read and transmitted by the scheduler 261(2) of the wavelength λ2. Likewise, the data stored in the buffer 262(2) of the wavelength λ2 can be read and transmitted by the scheduler 261(1) of the wavelength λ1. The same applies to the other wavelengths not illustrated in the drawing.

The allocation unit 253 allocates the transmission data input from the external NW 103-B to the buffers 262 of the respective wavelengths in the buffer unit 252. In the embodiment, the allocation unit 253 can avoid allocating any of the transmission data input from the external NW 103-B to the buffer 262 of a failure wavelength in the buffer unit 252, in accordance with a command from the allocation control unit 221.

The B-Tx unit 204 is a transmission unit that intermittently outputs an optical signal, and transmits a signal transferred from the L1 unit 201 as an optical signal to an optical fiber via an optical coupler in a burst manner. The B-Tx unit 204 also has a transmission unit (Tx) for each wavelength of the plurality of wavelengths. For example, the B-Tx unit 204 includes a Tx 204(1) of the wavelength λ1, a Tx 204(2) of the wavelength λ2, . . . , and a Tx 204(n) (not shown) of the wavelength λn. Specifically, the Tx 204(1) transmits a signal transferred from the L1 unit 201 as an optical signal of the wavelength λ1 in a burst manner, for example.

The B-Rx unit 205 is a reception unit that intermittently receives an optical signal, receives an optical signal from an optical fiber in a burst manner via an optical coupler, and transfers the signal to the L1 unit 201. The B-Rx unit 205 also has a reception unit (Rx) for each wavelength of the plurality of wavelengths. For example, the B-Rx unit 205 includes a Rx 205(1) of the wavelength λ1, a Rx 205(2) of the wavelength λ2, . . . , and a Rx 205(n) (not shown) of the wavelength λn. For example, the Rx 205(1) receives an optical signal from an optical fiber in a burst manner, and transfers the signal to the L1 unit 201. Here, the B-Tx unit 204 and the B-Rx unit 205 described above correspond to the communication unit.

The optical coupler 206 and the optical coupler 207 each have a function of branching the power of an input optical signal.

The determination unit 209 receives a notification of the reception status of an allocation signal or a search signal from the signal sensing unit 211 of the L2 unit 202, and determines whether the optical transmission device 101 as the master device is operating properly. For example, in a case where neither an allocation signal nor a search signal transmitted from the master device is received in a predetermined period, the determination unit 209 determines that the master device is not operating properly. Note that the determination is performed for each wavelength. When determining that the master device is not operating properly due to a failure or the like, the determination unit 209 then determines whether the subject device to which the determination unit 209 belongs is to operate as the master device. The determination unit 209 then instructs the L2 unit 202 that the subject device is to operate as the master device or is to operate as a slave device. Here, the determination as to whether the subject device is to operate as the master device is performed simultaneously in all the slave devices connected to the optical ring network 102. Note that exclusive processing is performed so that a plurality of slave devices does not operate simultaneously as master devices, and one slave device selected from the plurality of slave devices becomes the master device.

The signal sensing unit 211 senses an allocation signal or a search signal received from the optical ring network 102 for each wavelength. The signal sensing unit 211 then notifies the determination unit 209 of the reception status of an allocation signal or a search signal. Here, information regarding an allocation signal or a search signal includes information such as a device identifier, a transmission start time, and a transmission time. Further, a reception status is information such as the presence/absence of reception of an allocation signal or a search signal, and a reception time, for example. Note that the determination unit 209 selects one slave device to operate as the new master device from the plurality of slave devices on the basis of these pieces of information. In a case where the subject device is selected, the determination unit 209 switches the operation of the L2 unit 202 to that of the master device, to cause the subject device to operate as the master device.

In a case where the determination unit 209 determines that the master device has a failure, the scheduler control unit 220 instructs the scheduler unit 251 to suspend the data transmission at the failure wavelength (transmission suspension). The scheduler control unit 220 then instructs the scheduler 261 of another wavelength to transmit the data stored in the buffer 262 of the failure wavelength until the buffer amount of the buffer 262 of the failure wavelength in the buffer unit 252 becomes zero. Further, in a case where a notification of completion of switching to the master device is received from the determination unit 209, the scheduler control unit 220 instructs the scheduler unit 251 to resume the data transmission at the failure wavelength (transmission resumption).

In a case where the determination unit 209 determines that the master device has a failure, the allocation control unit 221 instructs the allocation unit 253 to suspend the allocation of data to the buffer 262 of the failure wavelength in the buffer unit 252. Further, in a case where a notification of completion of switching to the master device is received from the determination unit 209, the allocation control unit 221 instructs the allocation unit 253 to resume the allocation of data to the buffer 262 of the failure wavelength in the buffer unit 252.

As described above, each optical transmission device 101 according to the embodiment can shorten the transmission delay by suspending the transmission of data at the failure wavelength and the allocation of data to the buffer 262 of the failure wavelength, and transmitting the data stored in the buffer 262 of the failure wavelength at another wavelength during the period until a slave device starts operating as the new master device in place of the master device that is no longer able to operate properly.

(Process to Be Performed When a Failure Is Determined in the Master Device)

Figure 3:
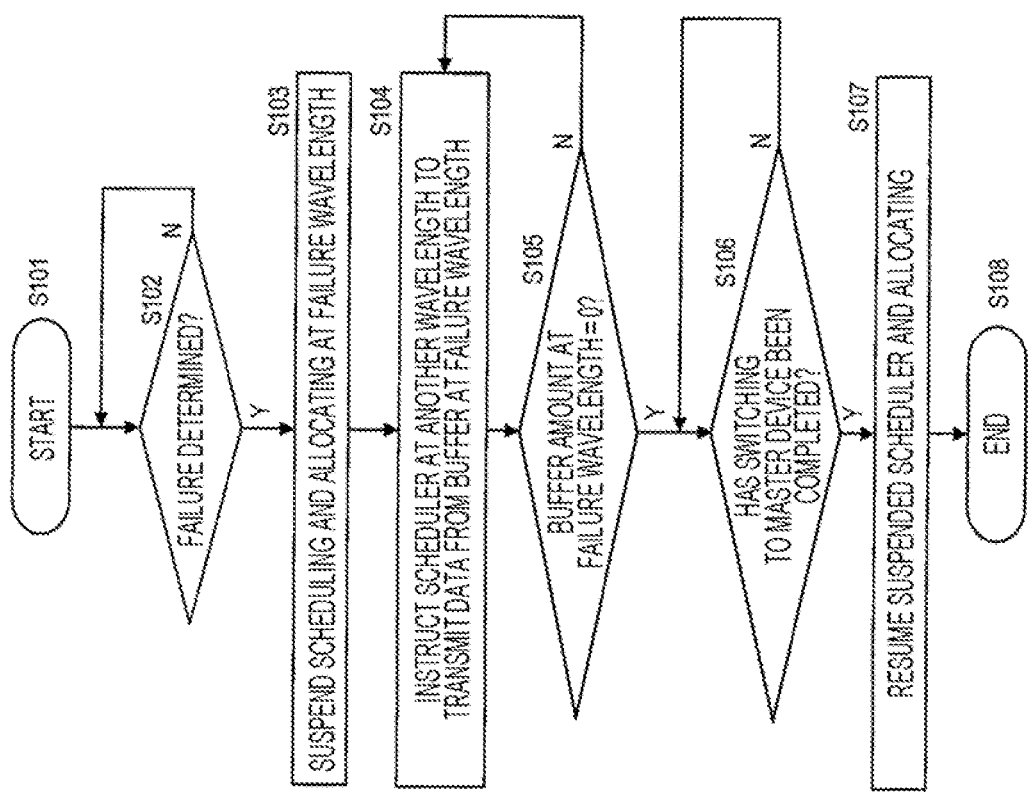

FIG. 3 illustrates an example process to be performed when the master device cannot operate properly due to a failure or the like. Here, FIG. 3 illustrates a process to be performed in a case where the optical transmission device 101 operates as a slave device, and the process is performed primarily by the signal sensing unit 211, the determination unit 209, the scheduler control unit 220, and the allocation control unit 221 of the optical transmission device 101-B described above with reference to FIG. 2. Note that a program corresponding to the process to be described with reference to FIG. 3 may be performed by a computer or an integrated circuit such as a field programmable gate array (FPGA). Alternatively, the program may be recorded in a storage medium to be provided, or may be provided through a network.

In step S101, the optical transmission device 101 operating as a slave device starts performing the process that is to be performed when the master device cannot operate properly due to a failure or the like.

In step S102, the determination unit 209 determines whether the master device is not operating properly due to a failure or the like (failure determination). For example, in a case where neither an allocation signal nor a search signal is received from the master device in a predetermined period, the determination unit 209 determines that there is a failure in the master device. If it is determined that the master device has a failure (Y), the process moves on to step S103. If the master device does not have any failure (N), the process in step S102 is repeated.

In step S103, the scheduler control unit 220 instructs the scheduler 261 of the failure wavelength in the scheduler unit 251 to suspend the scheduling. Also, when the transmission data input from the external NW 103 is allocated to the buffer unit 252, the allocation control unit 221 suspends the allocation to the buffer 262 of the failure wavelength. For example, in a case where the failure wavelength is the wavelength λ2, the scheduler control unit 220 instructs the scheduler 261(2) in the scheduler unit 251 to suspend the scheduling. Also, in a case where the failure wavelength is the wavelength λ2, the allocation control unit 221 suspends the allocation of the transmission data to the buffer 262(2) in the buffer unit 252.

In step S104, the scheduler control unit 220 instructs the scheduler 261 of another wavelength different from the failure wavelength to transmit the data from the buffer 262 of the failure wavelength. For example, in a case where the failure wavelength is the wavelength λ2, the scheduler control unit 220 instructs the scheduler 261(1) in the scheduler unit 251 to transmit the data stored in the buffer 262(2) of the failure wavelength at the wavelength λ1.

In step S105, the scheduler control unit 220 determines whether the buffer amount of the failure wavelength is zero. If the buffer amount of the failure wavelength is zero (Y), the process moves on to the process in step S106. If the buffer amount of the failure wavelength is not zero (N), the process returns to the process in step S104.

In step S106, the determination unit 209 determines whether the subject device or another slave device has completed switching to the master device in place of the failed master device. If switching to the master device has been completed (Y), the process moves on to step S107. If switching to the master device has not been completed (N), the process in step S106 is repeated. Here, it is possible to determine whether or not switching to the master device has been completed, by determining whether reception of an allocation signal or a search signal from the master device has been resumed at the failure wavelength, for example.

In step S107, the scheduler control unit 220 instructs the scheduler 261 of the failure wavelength to resume the scheduling. Also, the allocation control unit 221 instructs the allocation unit 253 to resume the allocation to the buffer 262 of the failure wavelength. For example, in a case where the failure wavelength is the wavelength λ2, the scheduler control unit 220 instructs the scheduler 261(2) in the scheduler unit 251 to resume the scheduling. Also, the allocation control unit 221 instructs the allocation unit 253 to resume the allocation of transmission data to the buffer 262(2).

In step S108, the process to be performed when the master device cannot operate properly due to a failure or the like comes to an end.

As described above, the optical transmission device 101 according to the embodiment can shorten the transmission delay by suspending the transmission of data at the failure wavelength and the allocation of data to the buffer 262 of the failure wavelength, and transmitting the data stored in the buffer 262 of the failure wavelength at another wavelength during the period until a slave device starts operating as the new master device in place of the master device that is no longer able to operate properly.

Comparative Example

Figure 4:
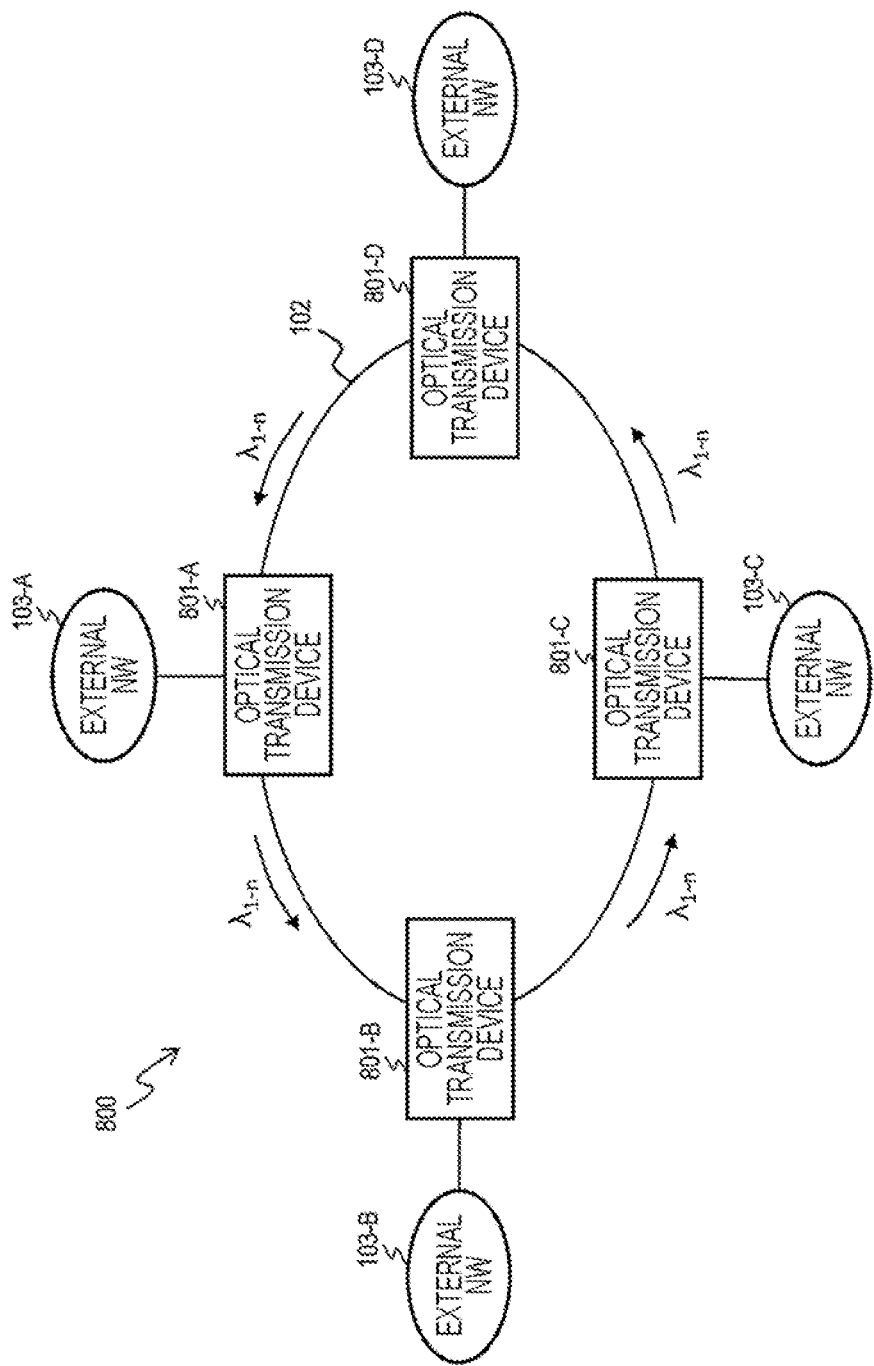
FIG. 4 is a diagram illustrating an optical ring network system of a comparative example.

FIG. 4 illustrates an optical ring network system 800 of a comparative example. Note that, in FIG. 4, blocks denoted by the same reference numerals as those in FIG. 1 operate in the same manner as those in FIG. 1.

In the comparative example in FIG. 4, an optical transmission device 801-A, an optical transmission device 801-B, an optical transmission device 801-C, and an optical transmission device 801-D are connected by an optical ring network 102.

A difference between the optical ring network system 800 of the comparative example in FIG. 4 and the optical ring network system 100 according to the embodiment in FIG. 1 is the functions of the four optical transmission devices 801. Like the optical transmission devices 101 according to the embodiment, each optical transmission device 801 of the comparative example can operate as a master device or a slave device, and has a function of making a slave device as the new master device in place of the master device that cannot operate properly. However, each optical transmission device 801 of the comparative example does not transmit data at the failure wavelength during the period until a slave device operates as the new master device, and therefore, the problem of a transmission delay occurs.

Figure 5:
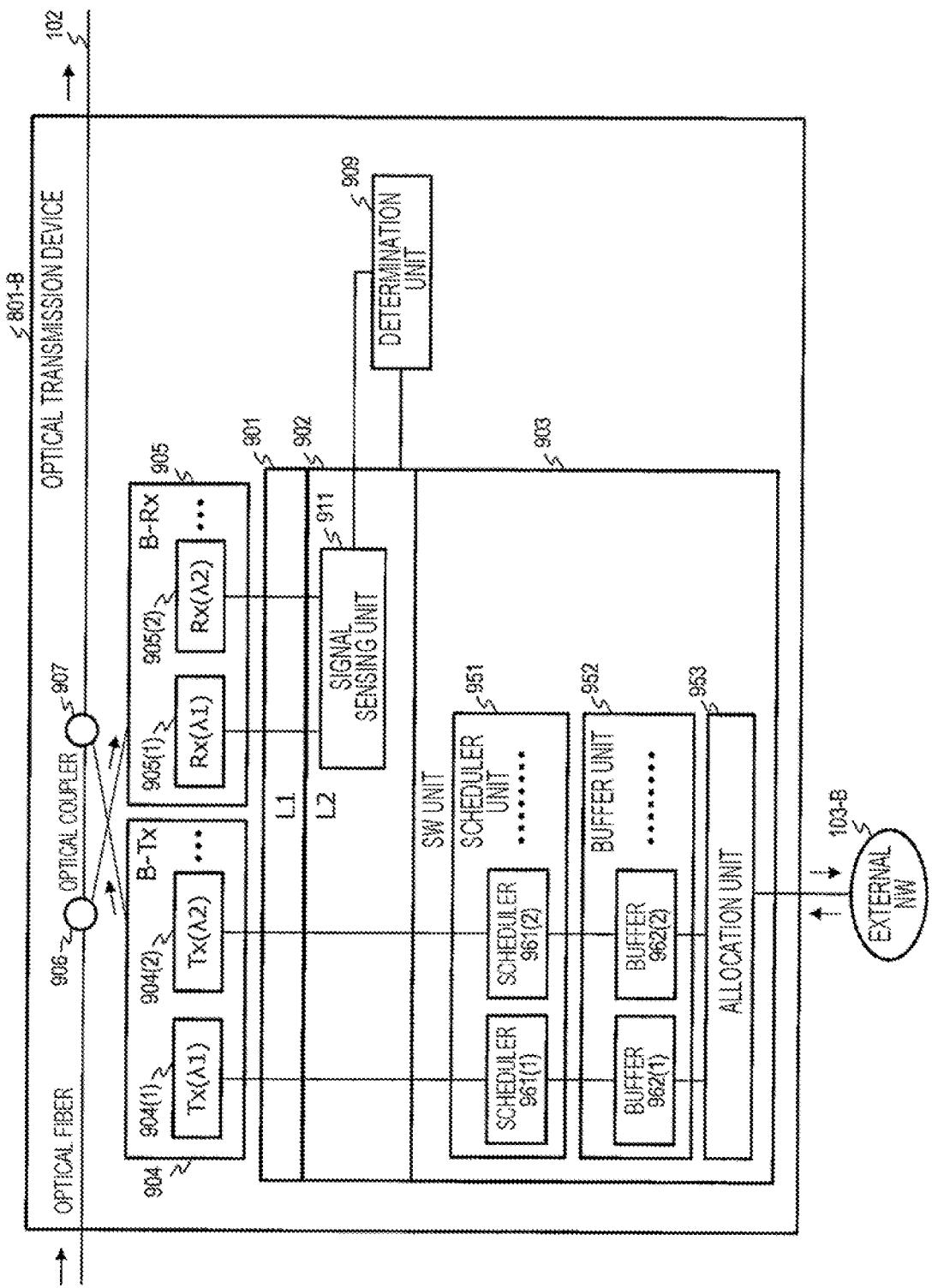
FIG. 5 is a diagram illustrating the configuration of an optical transmission device of the comparative example.

FIG. 5 illustrates an example configuration of the optical transmission device 801-B that operates as a slave device in the comparative example illustrated in FIG. 4. Note that the optical transmission device 801-C and the optical transmission device 801-D operate in the same manner as the optical transmission device 801-B. Here, in FIG. 4, the optical transmission device 801-A operates as the master device, and the optical transmission device 801-B, the optical transmission device 801-C, and the optical transmission device 801-D operate as the slave devices. Further, in the case described below, communication at a specific wavelength cannot be performed properly, due to a failure in the optical transmission device 801-A operating as the master device. Like the optical transmission device 101-B according to the embodiment in FIG. 2, the optical transmission device 801-B of the comparative example in FIG. 5 has a function of making a slave device as the new master device in place of the master device that cannot operate properly.

In FIG. 5, the optical transmission device 801-B includes a L1 unit 901, a L2 unit 902, a B-Tx unit 904, a B-Rx unit 905, an optical coupler 906, an optical coupler 907, a determination unit 909, and a signal sensing unit 911. Here, the basic functions of the optical transmission device 801-B are the same as those of the L1 unit 201, the L2 unit 202, the B-Tx unit 204, the B-Rx unit 205, the optical coupler 206, the optical coupler 207, the determination unit 209, and the signal sensing unit 211 of the optical transmission device 101-B according to the embodiment described above with reference to FIG. 2. However, the operation of a SW unit 903 of the comparative example differs from that of the SW unit 203 of the embodiment illustrated in FIG. 2.

In the SW unit 903, the data allocated to buffers 962 of the respective wavelengths by an allocation unit 953 is transmitted by schedulers 961 of the respective wavelengths. In the SW unit 203 according to the embodiment illustrated in FIG. 2, on the other hand, the data allocated to the buffers 262 of the respective wavelengths by the allocation unit 253 can be transmitted by the scheduler 261 of another wavelength, on the basis of a command from the scheduler control unit 220.

The SW unit 903 of the optical transmission device 801 of the comparative example includes a scheduler unit 951, a buffer unit 952, and the allocation unit 953.

The scheduler unit 951 transmits the data stored in the buffers 962 of the respective wavelengths in the buffer unit 952, in accordance with a predetermined schedule. Therefore, during the period until a slave device starts operating as the new master device in place of the master device that cannot operate properly, the data stored in the buffer 962 of the failure wavelength cannot be transmitted.

The allocation unit 953 allocates the transmission data input from the external NW 103-B to the buffers 962 of the respective wavelengths in the buffer unit 952. Therefore, during the period until a slave device starts operating as the new master device in place of the master device that cannot operate properly, data is continuously stored into the buffer 962 of the failure wavelength.

However, each optical transmission device 801 of the comparative example does not transmit data at the failure wavelength and continuously stores data into the buffer 962 during the period until a slave device starts operating as the new master device, and therefore, the problem of a transmission delay occurs.

On the other hand, the optical transmission device 101 according to the embodiment described above with reference to FIGS. 2 and 3 suspends the transmission of data at the failure wavelength and the allocation of data to the buffer 262 of the failure wavelength during the period until a slave device starts operating as the new master device in place of the master device that is no longer able to operate properly. Further, the optical transmission device 101 according to the embodiment transmits the data stored in the buffer 262 of the failure wavelength at another wavelength. Thus, the optical ring network system 100 according to the embodiment illustrated in FIG. 1 can shorten the data transmission delay at the failure wavelength.

As described above, the communication device, the communication method, the communication system, and the communication program according to the present invention are applied to a system in which a plurality of optical transmission devices including a master device and slave devices connected to a wavelength-multiplexed optical ring network performs communication by performing time-division multiplexing on optical signals at each wavelength. Each optical transmission device as a slave device can shorten the transmission delay by transmitting the transmission data stored in the buffer of the failure wavelength at another wavelength during the period until the optical transmission device starts operating as the new master device in place of the master device that is no longer able to operate properly.

REFERENCE SIGNS LIST 100, 800 optical ring network system
101, 801 optical transmission device
102 optical ring network
103 external NW
201, 901 L1 unit
202, 902 L2 unit
203, 903 SW unit
204, 904 B-Tx unit
205, 905 B-Rx unit
206, 207, 906, 907 optical coupler
209, 909 determination unit
211, 911 signal sensing unit
220 scheduler control unit
221 allocation control unit
251, 951 scheduler unit
252, 952 buffer unit
253, 953 allocation unit
261, 961 scheduler
262, 962 buffer

The invention claimed is:

1. A communication device comprising:
a communication unit that is connected to a wavelength-multiplexed optical ring network, conducts communication by performing time-division multiplexing on an optical signal for each wavelength, and receives a control signal transmitted from a master communication device;
a determination unit that determines, for each wavelength, that the master communication device is not operating properly, when the control signal is not received in a predetermined period;
an allocation unit that allocates data to be transmitted to a buffer of each wavelength;
a scheduler unit that transmits, for each wavelength, data stored in the buffer of each wavelength in accordance with a predetermined schedule;
a scheduler control unit that instructs the scheduler unit to suspend transmission of data at a failure wavelength, and instructs the scheduler unit to transmit the data stored in the buffer of the failure wavelength at another wavelength, the failure wavelength being a wavelength at which the master communication device has been determined not to be operating properly; and
an allocation control unit that suspends allocation of new data to the buffer of the failure wavelength.

2. The communication device according to claim 1, wherein
the determination unit determines that one of other communication devices including the subject communication device has started operating as a new master communication device in place of the master communication device that is not operating properly, the scheduler control unit instructs the scheduler unit to resume the transmission of data at the failure wavelength, and the allocation control unit instructs the allocation unit to resume the allocation of new data to the buffer of the failure wavelength.

3. A communication method that is used in a communication system that conducts communication by performing time-division multiplexing on an optical signal for each wavelength, one communication device of a plurality of communication devices connected to a wavelength-multiplexed optical ring network being a master communication device, the other communication devices being slave communication devices, wherein the master communication device transmits a control signal to a plurality of the slave communication devices, and each slave communication device determining, for each wavelength, that the master communication device is not operating properly when the control signal is not received from the master communication device in a predetermined period, instructs a scheduler unit to suspend transmission of data at a failure wavelength, the scheduler unit controlling transmission of data at the failure wavelength, the failure wavelength being a wavelength at which the master communication device has been determined not to be operating properly, and when there is data stored in a buffer of the failure wavelength, instructs the scheduler unit to transmit the data stored in the buffer of the failure wavelength at another wavelength, and suspends allocation of new data to the buffer of the failure wavelength.

4. The communication method according to claim 3, wherein the slave communication device determines that one of the other communication devices including the subject communication device has started operating as a new master communication device in place of the master communication device that is not operating properly, instructs the scheduler unit to resume the transmission of data at the failure wavelength, and instructs the allocation unit to resume the allocation of new data to the buffer of the failure wavelength.

5. A communication system that conducts communication by performing time-division multiplexing on optical signals for each wavelength, one communication device of a plurality of communication devices connected to a wavelength-multiplexed optical ring network being a master communication device, the other communication devices being slave communication devices, wherein the master communication device transmits a control signal to a plurality of the slave communication devices, and each slave communication device determining, for each wavelength, that the master communication device is not operating properly when the control signal is not received from the master communication device in a predetermined period, instructs a scheduler unit to suspend transmission of data at a failure wavelength, the scheduler unit controlling transmission of data at the failure wavelength, the failure wavelength being a wavelength at which the master communication device has been determined not to be operating properly, and when there is data stored in a buffer of the failure wavelength, instructs the scheduler unit to transmit the data stored in the buffer of the failure wavelength at another wavelength, and suspends allocation of new data to the buffer of the failure wavelength.

6. The communication system according to claim 5, wherein the slave communication device determines that one of the other communication devices including the subject communication device has started operating as a new master communication device in place of the master communication device that is not operating properly, instructs the scheduler unit to resume the transmission of data at the failure wavelength, and instructs the allocation unit to resume the allocation of new data to the buffer of the failure wavelength.

7. A non-transitory recording medium recording a communication program for causing a computer or an integrated circuit to perform processes that are performed by the communication device according to claim 1.

* * * * *